United States Patent
Newton et al.

(10) Patent No.: US 8,429,011 B2
(45) Date of Patent: Apr. 23, 2013

(54) METHOD AND SYSTEM FOR TARGETED ADVERTISING BASED ON TOPICAL MEMES

(75) Inventors: Christopher Daniel Newton, Douglas (CA); Marcel Albert Lebrun, Fredericton (CA); Christopher Bennett Ramsey, Fredericton (CA)

(73) Assignee: salesforce.com, inc., San Francisco, CA (US)

( * ) Notice: Subject to any disclaimer, the term of this patent is extended or adjusted under 35 U.S.C. 154(b) by 779 days.

(21) Appl. No.: 12/356,429

(22) Filed: Jan. 20, 2009

(65) Prior Publication Data
US 2009/0192896 A1 Jul. 30, 2009

Related U.S. Application Data

(60) Provisional application No. 61/023,187, filed on Jan. 24, 2008.

(51) Int. Cl.
*G06Q 30/00* (2012.01)
(52) U.S. Cl.
USPC ........................................................ 705/14.4
(58) Field of Classification Search ...................... 705/14
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |

(Continued)

OTHER PUBLICATIONS

Wikipedia, Non-negative matrix factorization—published on-line at http://en.wikipedia.org/wiki/Non-negative_matrix_factorization, dated Nov. 9, 2008.

(Continued)

*Primary Examiner* — Matthew L Hamilton
(74) *Attorney, Agent, or Firm* — Ingrassia Fisher & Lorenz, P.C.

(57) ABSTRACT

A targeted advertising system and method based on memes contained in content sources are disclosed. Content matching keywords-defining topics are identified from content sources and are further processed to extract the memes. Ad networks servicing the content are also identified and their reach for each meme determined. The system and method extract also viral dynamics of the content associated to a meme and use the aggregation of the viral dynamics as a measure of engagement level for the meme. The system and method allow a Marketer to select a meme based on the engagement level and to run an ad campaign against the meme. The advertisements are delivered through an Ad network and inserted at the meme page level when the content hosting the meme is accessed, the Ad network being selected based on its reach.

11 Claims, 7 Drawing Sheets

U.S. PATENT DOCUMENTS

| | | | |
|---|---|---|---|
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,260,041 B1 | 7/2001 | Gonzalez |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec |
| 6,324,693 B1 | 11/2001 | Brodersen et al. |
| 6,332,141 B2 | 12/2001 | Gonzalez |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,584,470 B2 | 6/2003 | Veale |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,694,307 B2 | 2/2004 | Julien |
| 6,697,807 B2 | 2/2004 | McGeachie |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,895,405 B1 | 5/2005 | Choi |
| 6,907,566 B1 | 6/2005 | McElfresh et al. |
| 7,047,244 B2 | 5/2006 | McGeachie |
| 7,100,111 B2 | 8/2006 | McElfresh et al. |
| 7,185,065 B1 | 2/2007 | Holtzman |
| 7,188,078 B2 | 3/2007 | Arnett |
| 7,188,079 B2 | 3/2007 | Arnett |
| 7,197,470 B1 | 3/2007 | Arnett |
| 7,269,590 B2 | 9/2007 | Hull et al. |
| 7,281,022 B2 * | 10/2007 | Gruhl et al. ............ 1/1 |
| 7,340,411 B2 | 3/2008 | Cook |
| 7,373,599 B2 | 5/2008 | McElfresh et al. |
| 7,406,501 B2 | 7/2008 | Szeto et al. |
| 7,426,557 B2 * | 9/2008 | Gruhl et al. ............ 709/223 |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,747,648 B1 | 6/2010 | Kraft et al. |
| 7,827,208 B2 | 11/2010 | Bosworth et al. |
| 7,853,881 B1 | 12/2010 | Aly Assal et al. |
| 7,856,445 B2 | 12/2010 | Gross |
| 7,945,653 B2 | 5/2011 | Zuckerberg et al. |
| 7,970,895 B2 * | 6/2011 | Gruhl et al. ............ 709/224 |
| 7,991,764 B2 | 8/2011 | Rathod |
| 8,005,896 B2 | 8/2011 | Cheah |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,166,013 B2 | 4/2012 | Bandaru et al. |
| 8,275,836 B2 | 9/2012 | Beaven et al. |
| 2001/0000192 A1 | 4/2001 | Gonzalez |
| 2001/0018687 A1 | 8/2001 | Gonzalez |
| 2001/0032203 A1 | 10/2001 | Gonzalez |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0010551 A1 | 1/2005 | McGeachie |
| 2005/0050555 A1 | 3/2005 | Exley et al. |
| 2005/0091098 A1 | 4/2005 | Brodersen et al. |
| 2005/0210065 A1 | 9/2005 | Nigam |
| 2005/0256905 A1 * | 11/2005 | Gruhl et al. ............ 707/104.1 |
| 2005/0256949 A1 * | 11/2005 | Gruhl et al. ............ 709/223 |
| 2006/0069589 A1 | 3/2006 | Nigam |
| 2006/0112111 A1 | 5/2006 | Tseng |
| 2006/0184464 A1 | 8/2006 | Tseng |
| 2006/0253316 A1 | 11/2006 | Blackshaw |
| 2006/0287987 A1 | 12/2006 | McGeachie |
| 2006/0287989 A1 | 12/2006 | Glance |
| 2007/0033188 A1 | 2/2007 | Levy |
| 2007/0033189 A1 | 2/2007 | Levy |
| 2007/0100779 A1 | 5/2007 | Levy |
| 2007/0100875 A1 | 5/2007 | Chi |
| 2007/0106627 A1 | 5/2007 | Srivastava |

| | | |
|---|---|---|
| 2007/0124208 A1 | 5/2007 | Schachter |
| 2007/0124432 A1 | 5/2007 | Holtzman |
| 2007/0150335 A1 | 6/2007 | Arnett |
| 2007/0208614 A1 | 9/2007 | Arnett |
| 2007/0214097 A1 | 9/2007 | Parsons |
| 2007/0239452 A1* | 10/2007 | Madhavan et al. ............ 704/252 |
| 2008/0010270 A1 | 1/2008 | Gross |
| 2008/0077582 A1 | 3/2008 | Reed |
| 2008/0082399 A1* | 4/2008 | Noble et al. .................... 705/10 |
| 2008/0147487 A1* | 6/2008 | Hirshberg ....................... 705/10 |
| 2008/0172606 A1 | 7/2008 | White |
| 2008/0209320 A1* | 8/2008 | Mawhinney et al. ......... 715/700 |
| 2008/0288516 A1* | 11/2008 | Hadfield ...................... 707/100 |
| 2009/0222743 A1* | 9/2009 | Hadfield ....................... 715/753 |
| 2010/0070485 A1* | 3/2010 | Parsons et al. ................ 707/709 |
| 2010/0125502 A1 | 5/2010 | Solomon et al. |
| 2010/0217757 A1 | 8/2010 | Fujioka |
| 2010/0241576 A1 | 9/2010 | Beeri |
| 2011/0209067 A1 | 8/2011 | Bogess et al. |
| 2011/0258204 A1 | 10/2011 | Hubbard et al. |

OTHER PUBLICATIONS

Toby Segaran, Programming Collective Intelligence, Published by O'Reilly, Aug. 2007.

U.S. Appl. No. 13/478,002, filed May 22, 2012.

United States Patent Office, U.S. Non-Final Office Action for U.S. Appl. No. 12/278,277 dated Sep. 14, 2012.

United States Patent Office, U.S. Non-Final Office Action for U.S. Appl. No. 13/074,809 dated Oct. 3, 2012.

Linear Combination-Wikipedia (http://en.wikipedia.org/wiki/Linear_Combination (accessed Jul. 16, 2012).

Final Office Action for U.S. Appl. No. 12/437,418, mailed Apr. 16, 2012.

Notice of Allowance for U.S. Appl. No. 12/819,402, mailed May 14, 2012.

Non-Final Office Action for U.S. Appl. No. 13/453,802, mailed Jun. 8, 2012.

* cited by examiner

METHOD AND SYSTEM FOR TARGETED ADVERTISING BASED ON TOPICAL MEMES

RELATED APPLICATIONS

The present application claims benefit from the U.S. provisional application to Christopher NEWTON et al. Ser. No. 61/023,187 filed on Jan. 24, 2008 entitled "Method and System for Targeted Advertising Based on Topical Memes", which is incorporated herein by reference.

FIELD OF INVENTION

The present patent application relates to a computer implemented method and system for targeted advertising, and in particular, to a computer implemented method and system for targeted advertising based on topical memes.

BACKGROUND OF THE INVENTION

Current on-line advertisement targeting methods are either site based, keyword based, contextual, or demographic based.

Site based targeted advertising involves a media buyer deciding to run advertisements, to be also briefly referred to as "Ads", on a specific property based on their knowledge of the property.

Keyword based targeted advertising involves a media buyer selecting keywords, and Ad networks delivering Ads to web pages, which contain the content including those keywords. This method of serving Ads means that a media buyer's Ad may be seen on thousands of web sites that happen to contain the keywords being used. These methods, although widely used in social media web sites, do not accurately target Ads to the interest of end users, which may not be related to selected keywords but rather to the points of discussions typically called also memes. The rise of social media means that there are millions of conversations going on at any time. Those conversations evolve into multiparty (multi-site) memes. Often these memes can be very beneficial to one or more brands, even if the memes are negative.

Marketers would be very much interested to launch ads targeted against these memes, but today no method or system exists to identify memes amongst the millions of conversations and to target Ads against those memes.

Accordingly, there is a need in the industry for the development of an automated method and system for targeted advertising against memes, which would be more specific to the interests of end users.

SUMMARY OF THE INVENTION

There is an object of the invention to provide a method and system for targeted advertising based on topical memes, which would cater to the interest of the end users.

According to one aspect of the present invention, a method for targeting advertisement is disclosed, the method comprising steps of:
(a) selecting a meme;
(b) identifying web pages containing the selected meme;
(c) selecting an advertising network servicing a number of content sources hosting said web pages;
(d) selecting an advertisement assigned to the selected meme;
(e) delivering said selected advertisement to said number of said content sources through said advertising network; and
(g) inserting the selected advertisement into the web pages.

The step of selecting the meme comprises:
i) retrieving content matching a selected topic;
ii) extracting a set of memes from the matching content;
iii) associating each meme of the set of memes with its associated content, wherein each associated content includes a web page containing said each meme; and
iv) storing the set of memes along with their respective associated content in a database.

Furthermore, the method comprises:
extracting viral dynamics of the content matching the selected topic; and
for said each meme, aggregating the viral dynamics of the content associated with said each meme.

Beneficially, the method further comprises storing aggregate values of the viral dynamics along with their associated meme in a database In one modification, the step of extracting the set of memes comprises applying a feature extraction algorithm to said matching content.

In another modification step (c) of the method comprises:
i) extracting a list of advertising networks servicing the content sources; and
ii) selecting, from said list, the advertising network having a widest reach.

In a further modification step (d) of the method comprises:
i) setting an advertisement and a deployment threshold for said advertisement;
ii) comparing the deployment threshold with an aggregate value of viral dynamics associated with the selected meme; and
iii) assigning the advertisement to the selected meme provided the deployment threshold matches the aggregate value of the viral dynamics associated with the selected meme.

Advantageously, the method further comprises:
maintaining the assigned advertisement on said web pages provided that the aggregate value of the viral dynamics associated with the selected meme is above the deployment threshold; and
removing the selected advertisement from said web pages provided that the aggregate value of the viral dynamics associated with the selected meme is below the deployment threshold.

According to another aspect of the present invention a method of targeting advertisement is disclosed, the method comprising:
(a) selecting a topic;
(b) retrieving content matching the selected topic;
(c) extracting a meme from the matching content; and
(d) running an advertisement campaign against said meme wherein said advertisement campaign is targeted to pages containing the meme Advantageously, said meme is extracted by applying a feature extraction algorithm to the matching content.

Furthermore, the method comprises extracting viral dynamics of the matching content and aggregating the viral dynamics of a subset content associated with selected meme to determine an aggregate value of viral dynamics associated with the selected meme wherein the subset content is a subset of the matching content.

Beneficially, the method comprises storing the aggregate value of the viral dynamics in time series.

In one modification, the method further comprises terminating the advertisement campaign when said aggregate value of the viral dynamics is below a threshold.

In another modification step (d) of the method comprises:
i) selecting an advertising network from a list of advertising networks;
ii) selecting an advertisement to run against the selected meme; and
iii) inserting the advertisement into selected pages of said matching content containing the meme, wherein said advertisement is delivered through the selected advertising network.

Furthermore the advertising network is selected to maximize a number of pages containing the selected meme that can be reached by the advertisement campaign.

In yet another aspect of the present invention a system for performing a meme-based targeted advertising is disclosed, the system comprising:
a computer, having a processor and a computer readable storage medium storing computer readable instructions for execution by the processor, to form the following modules:
(a) a first processing module operably connected to one or more content sources for extracting a meme from content matching a selected topic, and for associating the meme to a subset content containing the meme wherein the subset content is a subset of said content matching the selected topic;
(b) a second processing module operably connected to said first processing module for selecting advertising networks servicing said content sources; and
(c) a third processing module operably connected to said first and second processing module for delivering advertisements through the selected advertising networks to web pages containing the meme and included in the subset content.

The system further comprises a viral dynamics extraction module for extracting viral dynamics of the matching content and aggregating the viral dynamics of the subset content.

Furthermore the system comprises a database stored in a computer readable storage medium for storing aggregate values of the viral dynamics.

Advantageously, the system further comprises an analysis module for analyzing the content against the selected topic defined by a set of keywords and for identifying the content matching the selected topic.

Beneficially, the system further comprises an advertisement matching module for selecting one or more advertisements matching the meme and for comparing a deployment threshold associated with said one or more advertisements with an aggregate value of viral dynamics associated to said meme.

In a further aspect of the present invention, it is disclosed a computer readable medium, comprising a computer code instructions stored thereon, which, when executed by a computer, perform the steps of the methods of the present invention.

The present invention will be more fully understood from the following detailed description of the preferred embodiments that should be read in light of the accompanying drawings.

BRIEF DESCRIPTION OF THE DRAWINGS

Embodiments of the invention will now be described, by way of example, with reference to the accompanying drawings in which.

DETAILED DESCRIPTION OF THE
EMBODIMENTS OF THE INVENTION

Embodiments of the invention describe a system for supporting the extraction of memes and associated viral dynamics from content sources, and methods for delivering Ads targeted to selected memes using such a system. With reference to the drawings, in general, and FIGS. 1 to 7, in particular, the method and system of the present invention are disclosed.

Figure 1:
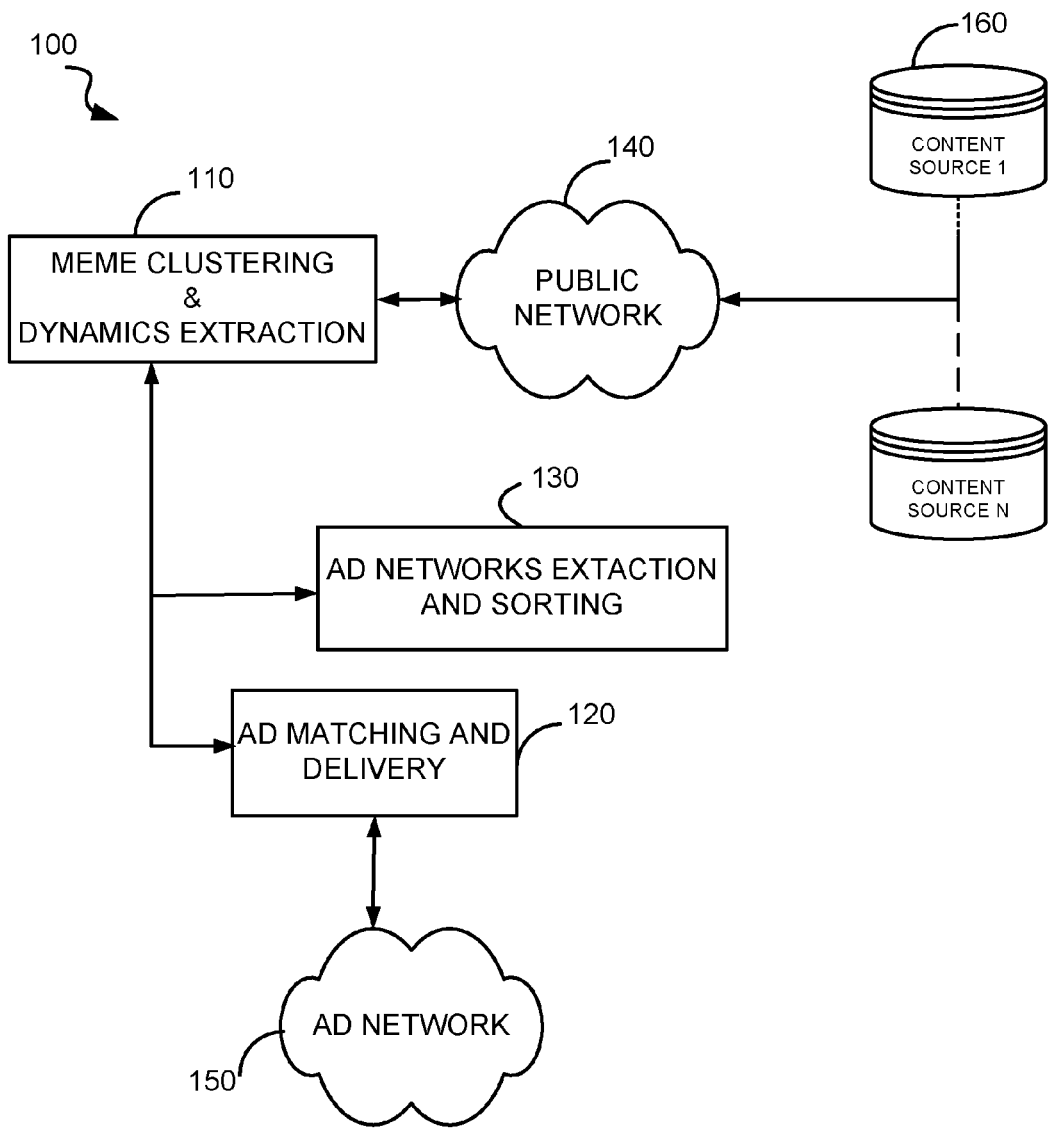
FIG. 1 is a block diagram illustrating a system for meme-based targeted advertisement according to the embodiment of the present invention.

FIG. 1 illustrates a system 100 for meme-based targeted advertisement according to an embodiment of the present invention. The system 100 comprises a first processing module represented by a Meme Clustering and Viral Dynamics Extraction Module 110 communicating to content sources 160 via a public network 140. The public network 140 can be the Internet, a Public Switched Telephone Network (PSTN), a mobile network, or any other network providing connectivity to content sources 160.

Content sources 160 are publicly available sources of media or multimedia content such as web content including text, audio, video, images or any combination thereof. The content sources 160 can include on-line publications by social media communities, such as blogospheres hosting various content, for example, web posts, articles, websites, consumer generated audio and/or videos, consumer generated images or any other content that the system of the present invention can access through the public network 140. Each publication of the content may have one or more pages for text-based content, and/or one or more parts for audio, video or image-based content.

The Meme Clustering and Viral Dynamics Extraction module 110, also referred to as meme module 110 comprises a hardware platform, for example, a general purpose or specialized computer, including a central processing unit (CPU), and a computer readable medium, (e.g., a memory and other storage devices such as CD, DVD, hard disk drive, etc) having instructions stored thereon for execution by the CPU.

The Meme Clustering and Viral Dynamics Extraction module 110 is provided for extracting and clustering memes, also called topical memes, within topics discussed in the accessed content, and for further storing the clustered topical memes. The Meme Clustering and Viral Dynamics Extraction module 110 also performs the extraction of viral dynamics associated with the content retrieved from the content sources 160 and further stores the viral dynamics for each piece of content in a database. The meme module 110 will be described in more details hereinafter with reference to FIGS. 2 and 3 below.

As shown in FIG. 1, the meme module 110 is connected to a second processing module represented by an Ad Networks Extraction and Sorting module 130 as well as to a third processing module represented by an Ad Matching and Delivery module 120.

The Ad Networks Extraction and Sorting module 130 comprises a hardware platform, for example, a general purpose or specialized computer, including a central processing unit (CPU), and a computer readable medium, (e.g., a memory and other storage devices such as CD, DVD, hard disk drive, etc) having instructions stored thereon for execution by the CPU. The Ad Networks Extraction and Sorting module 130 identifies and sorts advertising networks, for brevity Ad networks, that run advertisements (Ads) on content sources 160 associated with the stored topical memes. Ad networks are typically advertisement delivery networks such as those managed by Google, Yahoo, Doubleclick, ValueClick Media or other known Ad networks, which deliver selected Ads to selected web content or pages according to set criteria. The extraction and sorting module 130 will be described in more detail with regard to FIGS. 4 and 5 below.

The Ad Matching and Delivery module 120 comprises a hardware platform, for example, a general purpose or specialized computer, including a central processing unit (CPU), and a computer readable medium, (e.g., a memory and other storage devices such as CD, DVD, hard disk drive, etc) having instructions stored thereon for execution by the CPU. The Ad Matching and Delivery module 120 matches Ads to a selected meme and delivers the Ads through the Ad Network 150 to content sources 160 associated with the selected meme. In one embodiment, the Ad delivery is carried out according to predetermined targeting criteria related, inter alia, to the Ad Network 150 and the content sources 160. The Ad Matching and Delivery module 120 will be described in more detail with regard to FIGS. 6 and 7 below.

Companies are generally interested in running Ads that are specifically placed on content related to specific topics, and optionally, revolving around a particular meme or point of discussion. Accordingly, the system 100 of the embodiment of the invention identifies the content related to a certain topic and extracts respective topical memes. These functions are performed by the "Meme Clustering and Viral Dynamics Extraction" module 110 shown in FIG. 1.

he system 100, including all modules illustrated in FIG. 1, can be implemented in one or more software modules running on a hardware platform, comprising computer readable instructions stored in a computer readable medium, for example, a general purpose or specialized computer, including a central processing unit (CPU), and a computer readable medium having instructions stored thereon, e.g., a memory and other storage devices such as CD, DVD, hard disk drive, etc. As an example, the modules of the system 100 can be implemented as individual software modules running on the same hardware platform. Alternatively, the modules of the system 100 can be implemented on different hardware platforms, e.g., on different computers connected in a network. Other implementations are possible and are well known to the persons skilled in the art.

The operation of the "Meme Clustering and Viral Dynamics Extraction" module 110 will now be described in more detail with reference to FIG. 2.

Figure 2:
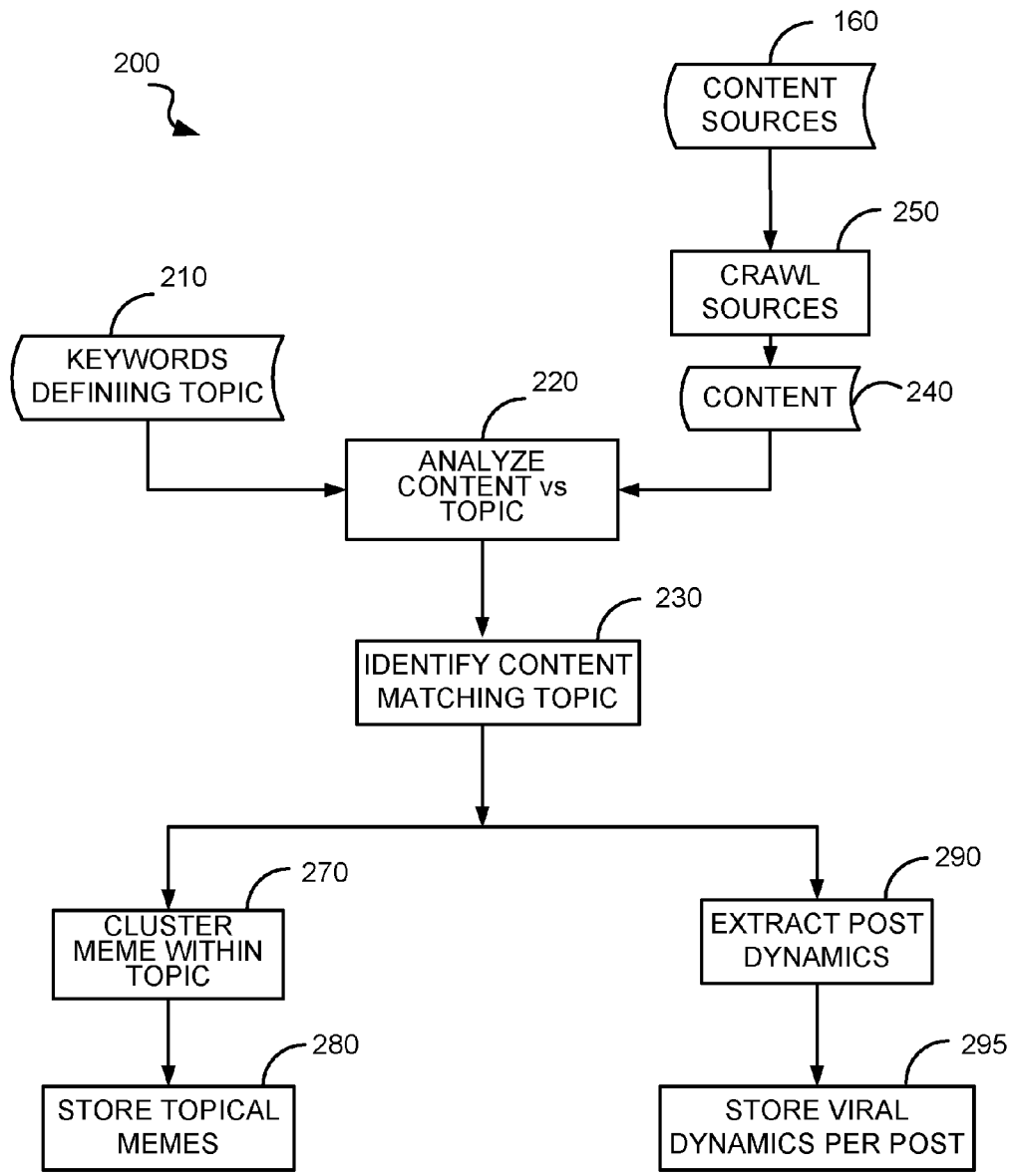
FIG. 2 illustrates an operation of the "Meme Clustering and Viral Dynamics Extraction" module of FIG. 1.

FIG. 2 shows a flowchart 200 illustrating the operation of the meme module 110 of FIG. 1, including steps of generating topical memes, and extracting viral dynamics of posts associated to the memes. Content sources 160, which are also shown in FIG. 1, represent web sources or other on-line social media communities as described earlier that are accessed by crawl sources at step 250 to retrieve relevant content at step 240. At step 220, the content 240 is analyzed against a topic defined by keywords entered at step 210. By way of example, the keywords defining the topics can be "US Politics" for a topic profile, and "Barack Obama" and/or "Hilary Clinton" as the keywords. Existing topics and associated keywords are stored in a database (not shown), comprising computer readable instructions stored in a computer readable storage medium, such as computer memory, CD-ROM, DVD, floppy, tape or other storage medium, and new keywords defining new topics may be inputted through a graphical user interface (not shown) to the system 100 of FIG. 1.

The step 220 analyzes the keywords against the content 240 retrieved from the content sources 260, and step 230 identifies the content that matches the keywords defining selected topic.

At step 270 named "Cluster Memes within Topic", the content identified at the step 230, is processed to extract points of discussion, or topical memes, associated with the content. The extraction of the memes can be performed using independent feature extraction algorithms that are known in the data analysis field. An example of a feature extraction algorithm that can be used at step 270 is a Non-Negative Matrix Factorization, see, for example an article in Wikipedia entitled "Non-Negative Matrix Factorization" cited in the Information Disclosure Statement for this application. Other algorithms such as Principal Component Analysis (PCA) or other algorithms described, e.g., in the book entitled "Programming Collective Intelligence" by Toby Segaran published by O'Reilly Media press in August 2007, which is incorporated herein by reference, could be used to extract topical memes from on-line content.

The topical memes thus extracted are further clustered. In the embodiment of the invention, each extracted topical meme is associated with a subset content, which contain the meme. This subset content is a subset of the content matching the selected topic. At step 280 of the flowchart 200, the clustered topical memes are stored along with their associated subset content in a database stored in a computer readable storage medium (not shown). Following the example of keywords defining topics provided above, the step 270 "Cluster Meme Within Topic" could find the following topical memes: "Barak Obama in the lead in primaries" with 7 more articles related; and "Hillary Clinton disagrees with Obama on key points" with 12 more related articles. These 2 topical memes would then be stored in the database at step 280 along with their respective subsets content.

In the embodiment of the present invention an advertising campaign is run against one or more selected memes according to certain engagement metrics thresholds related to the memes.

Engagement metrics, also to be referred to as viral dynamics, are defined as various social media popularity metrics, such as total meme comment count, unique commenter count, inbound link count, breadth of reply, views, bookmarks, votes, buries, favorites, awards, acceleration, momentum, subscription counts, replies, spoofs, ratings, friends, followers, and updates, etc. Other viral dynamics that can be extracted from the content are listed in the co-pending U.S. patent application Ser. No. 12/174,345 filed Jul. 18, 2008 entitled "Method And System For Determining Topical On-Line Influence Of An Entity", which is incorporated herein by reference.

In the embodiment of the present invention, the viral dynamics for each post or piece of content are extracted at step 290 of flowchart 200 and, at step 295, the viral dynamics per post are stored in a database (not shown) having computer readable instructions stored in a computer readable storage medium.

Referring back to the above example, for the meme of "Barak Obama in the lead in primaries", each of the 7 related articles are processed, and the viral dynamics or each article are extracted as described above.

Figure 3:
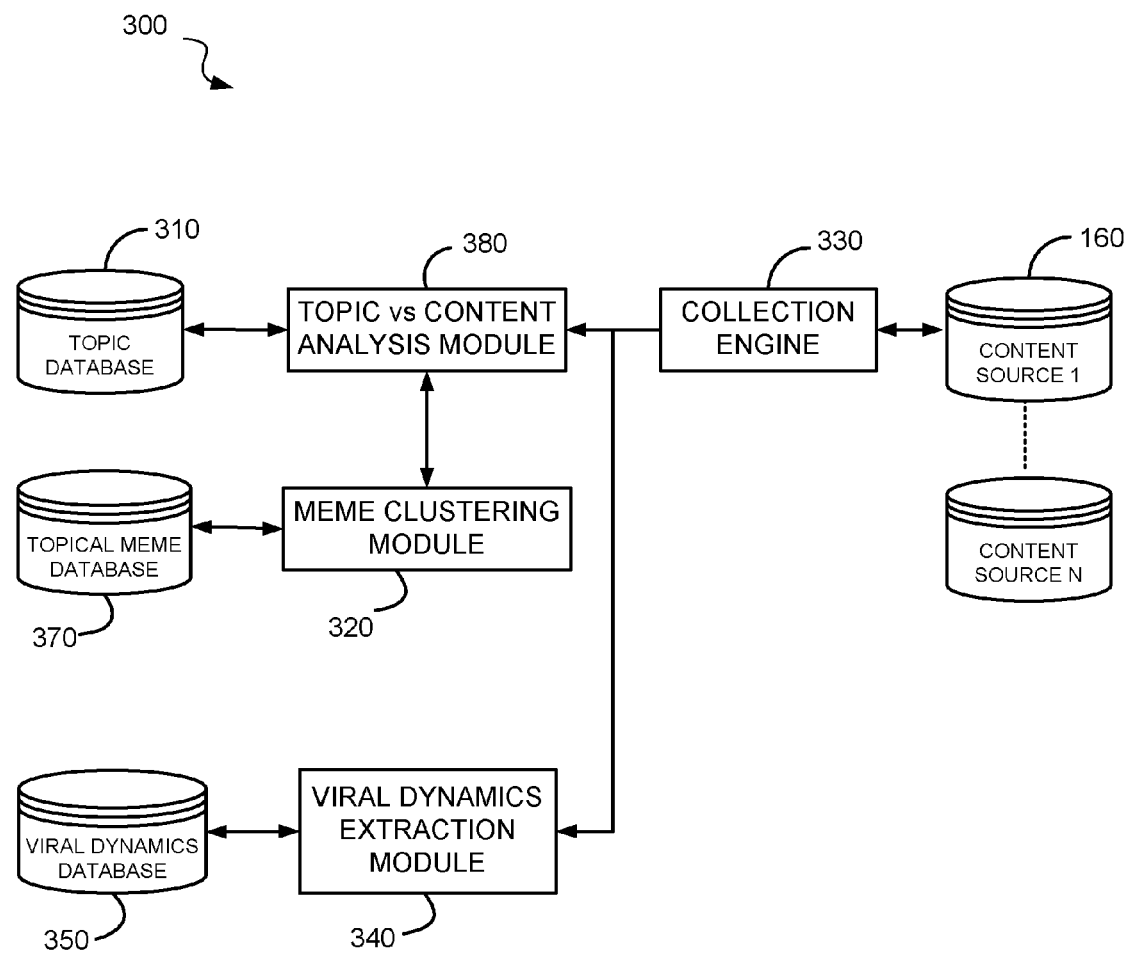
FIG. 3 illustrates a structure of the "Meme Clustering and Viral Dynamics Extraction" module of FIG. 1.

FIG. 3 shows a sub-system 300 for implementing the "Meme Clustering and Viral Dynamics Extraction" module 110 of FIG. 1, which operation has been described with regard to FIG. 2 above.

The sub-system 300 includes a Collection Engine module 330 connected to content sources 160 for retrieving content such as articles, posts and multimedia data as described earlier in accordance with FIG. 1. The Collection Engine Module 330 can take the form of a search engine, internet crawler or other collections mechanisms that can be used to access public data and retrieve its content.

An Analysis module 380 is connected to the Collection Engine 330, and to a Topic Database 310 storing keyword-defining topics. The Analysis module 380 performs a Topic versus Content analysis to identify content that matches the topics. In another embodiment, the Analysis module 380 has a graphical user interface to allow a user to enter keywords and/or topics that can be used to identify matching content.

A Meme Clustering module 320 is connected to the Analysis module 380 for receiving the matching content identified by the Analysis module 380. The Meme Clustering module 320 runs feature extraction and clustering algorithms to identify memes or distinct conversation points present in the matching content, and to further cluster the memes along with their associated subset content. The algorithms applied by the clustering module 320 are described above in step 270 of FIG. 2. The memes extracted within a topic are thus grouped along with their associated subset content and stored in a Topical Memes Database 370. In the embodiment, each cluster includes a meme and a subset content in which the meme appears.

The Topic vs Content Analysis Module 380 is also connected to a Viral Dynamics Extraction module 340. The Viral Dynamics Extraction module 340 measures the engagement level for each piece of content as described with respect to step 290 of FIG. 2 and as further described in detail in the co-pending provisional application cited above. The viral dynamics of the content obtained by the module 340 are stored in a viral dynamics database 350.

The sub-system 300 can be implemented as a single software module running on a hardware platform, including computer readable instructions stored in a computer readable medium, for example, a general purpose or specialized computer, including a central processing unit (CPU), and a computer readable medium, e.g., a memory and other storage devices such as CD, DVD, hard disk drive, etc. containing instructions for execution by the CPU and performing the functions of the module 380, module 320, module 330 and module 340 described above.

Alternatively, the sub-system 300 can be implemented as a distributed platform, including module 380, module 320, module 330 and module 340 implemented individually, or in selective groupings, for example, as dedicated server computers interconnected by a bus, a local and/or a wide area network using a wired, a wireless medium or a combination thereof. Each module implemented as a server computer includes a processor and computer readable instructions stored in a computer readable medium for execution by the processor and performing the functions of the module. The computer readable medium, includes, a memory and other storage devices such as CD, DVD, hard disk drive, etc.

Each of the database modules 350, 370 and 310 can be of any type of commercial or proprietary database that allows data to be accessed for read and write operations and includes a computer readable medium, e.g., a memory and other storage devices such as CD, DVD, hard disk drive, etc., and instructions stored thereon for performing various functions of the database The method and system of the embodiments of the present invention provide the flexibility of selecting an Ad Network through which an advertising campaign can be run according to certain performance criteria, e.g., its level of reach for a selected meme. The level of reach in this instance refers to the number of social web sites or pages within those websites containing the selected meme and serviced by the Ad network.

Figure 4:
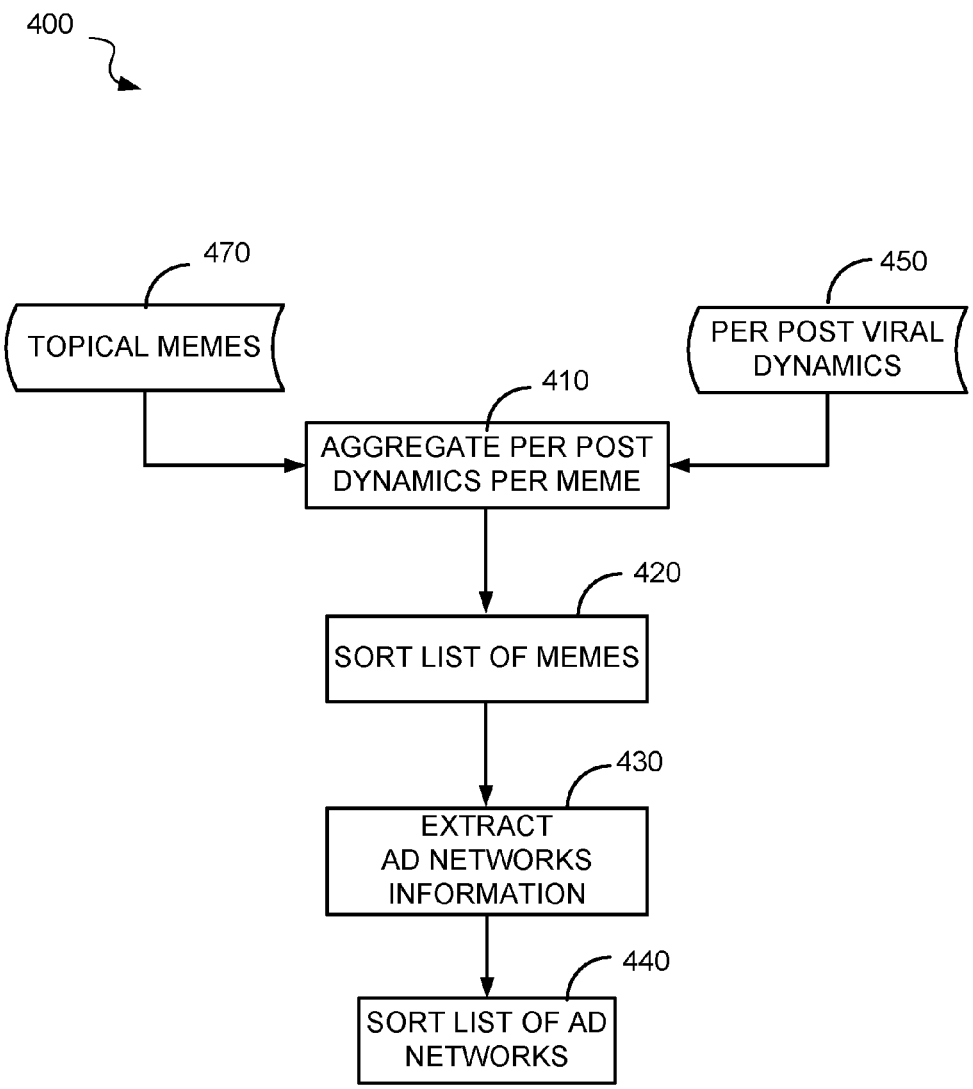
FIG. 4 illustrates steps of a method for extracting and sorting advertising networks.

FIG. 4 shows a flowchart 400 illustrating an Ad network extraction and sorting method as well as the aggregation of the viral dynamics extracted from a set of content related to a meme. The topical memes 470 and the Per Post Viral Dynamics 450 generated previously in the flowchart 200 of FIG. 2 at steps 270 and 290, respectively, are used as inputs to the "Aggregate per Post Dynamics Per Meme" step 410. At step 410, the viral dynamics of all posts or pieces of content within a subset content are aggregated for each corresponding topical meme, and at step 420, the list of topical memes is sorted according to their aggregate value of viral dynamics.

The aggregate value, in this instance, refers to the accumulation of viral dynamics across all the posts or pieces of content within a subset content associated with a topical meme. This accumulation can be done over time during which the viral dynamics for any new post is added to the aggregate value. Alternatively, the aggregation can be normalized against a selected period of time wherein the total count of viral dynamics per post is normalized against the duration of the post. Other methods for measuring the level of engagement over a period of time or for determining the most active meme can as well be adopted, including recording the aggregate values of the viral dynamics of the posts in time series to monitor the evolution of the viral dynamics over a period of time.

At step 430, the Ad networks supporting the delivery of advertisements are identified and extracted. At step 440, the extracted list of Ad networks is sorted and the sorted list is further stored in a database (not shown). The sorted list of Ad networks allows the system and the method of the present invention to determine for each meme, the level of reach of the Ad networks.

Referring back to the above example, the method of flowchart 400 can find that Google is present on 5 of the 7 sites containing the 7 articles related to the meme "Barak Obama in the lead in primaries", and Yahoo is present only on the 2 remaining sites. In this case running an advertising campaign through the Google network would provide a wider reach than through the Yahoo network assuming that the meme viral dynamics are the same on all sites.

Figure 5:
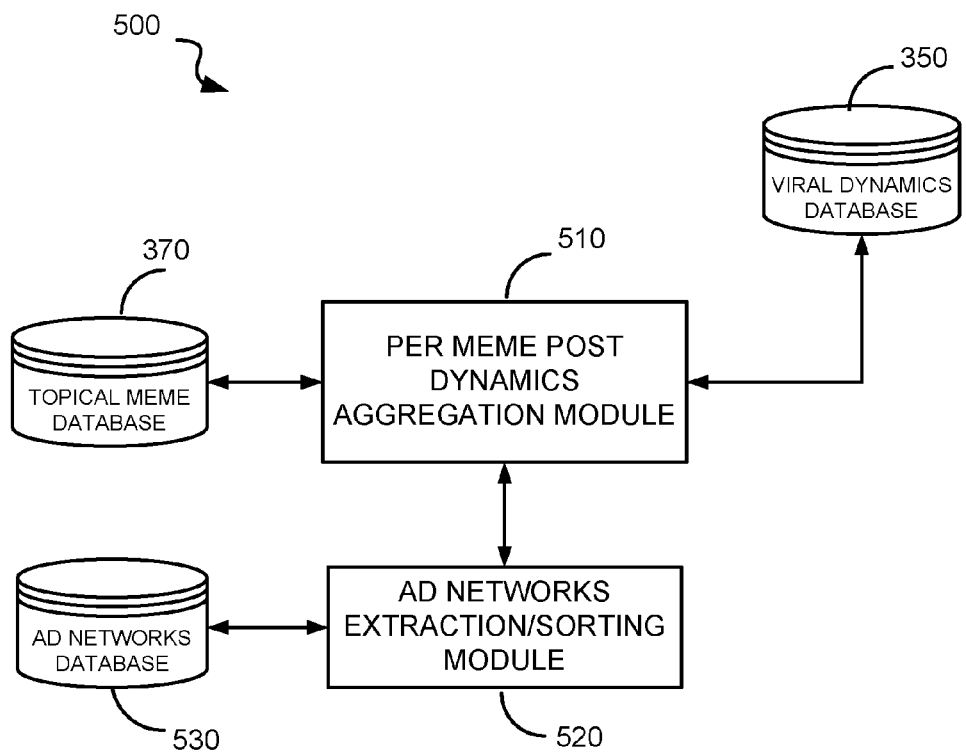
FIG. 5 illustrates a sub-system for extracting and sorting the advertising networks, where the method of FIG. 4 is implemented.

The method of flowchart 400 of FIG. 4 can be implemented using a sub-system 500 of FIG. 5, in which processing modules "Per Meme Post Dynamics Aggregation Module" 510 and "Ad Network Extraction/Sorting Module" 520 are interconnected with databases (Topical meme database 570, Viral Dynamics database 550 and Ad networks database 530) to support the Ad networks extraction and sorting features of the embodiment of the present invention.

Figure 6:
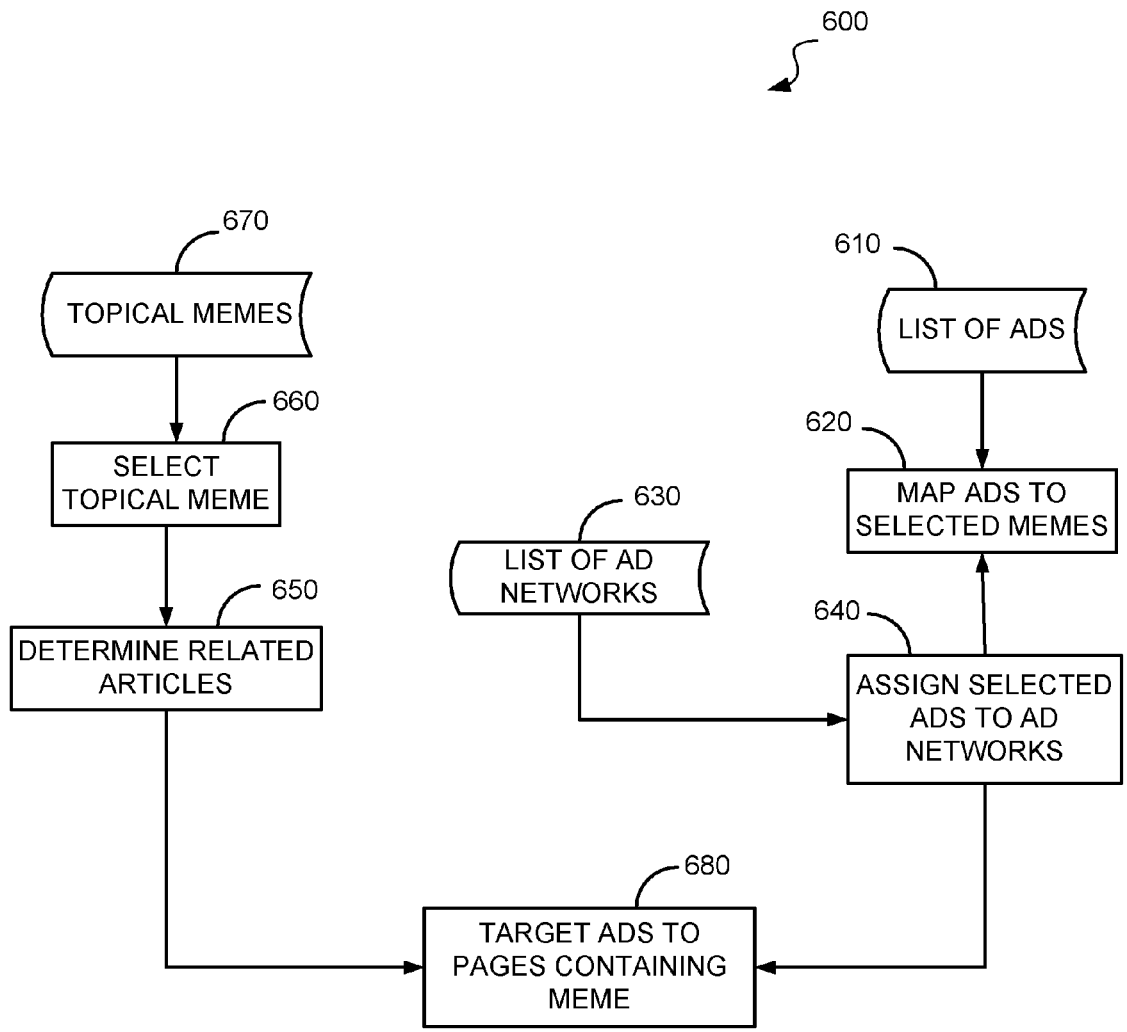
FIG. 6 illustrates steps of a method for matching and delivery of advertisements.

The Per Meme Post Dynamics Aggregation module 510 receives a topical meme from the Topical Memes database 370, and also receives the viral dynamics associated with the received topical meme stored in the Viral Dynamics database 350 to aggregate the count of viral dynamics per post as described above with regard to step 410 of FIG. 4. This aggregation allows the system to determine the most active memes. This information is used by an Ad campaigner/marketer to select a meme against which he can run an advertising campaign. The Ad Networks Extraction and Sorting module 520, in the present embodiment, retrieves the identity of Ad networks providers from the content associated to the topical memes stored in the database 370 and sorts them according to their level of reach. This extraction and sorting, as described previously, can be used by an Ad campaigner to select the Ad Network that would provide a wider reach. The sorted list of Ad Networks is stored in a database 530. The Ad Networks Database 530 can be of any type of commercial or proprietary database that allows data to be accessed for read and write operations and includes a computer readable medium, e.g., a memory and other storage devices such as CD, DVD, hard disk drive, etc., and instructions stored thereon for performing various functions of the database FIG. 6 shows an Ad Matching and Delivery flowchart 600 illustrating a method of performing targeting and delivery of meme page-level advertisement. Meme page-level advertisement targeting refers to the targeting of an advertisement to a page containing the selected meme. In this embodiment, an Ad campaigner selects a topical meme at step 660 from a set of Topical memes 670, followed by an automatic retrieval of related articles or posts at step 650. In addition, the Ad campaigner creates a list of Ads at step 610, and at step 620, performs an Ad-to-Meme mapping, which results in the selection of Ads to be run against the topical meme selected at step 660.

In one embodiment, each Ad is associated with a deployment threshold, which determines when the Ad can be used in an Ad campaign, or withdrawn from the Ad campaign. In this embodiment, an Ad is maintained in an Ad campaign as long as the aggregate value of the viral dynamics associated with the meme is within a specified boundary or above the deployment threshold for the Ad. The Ad would be withdrawn from advertising, when the viral dynamics falls out of the boundary or below the deployment threshold.

At step 640, the selected Ads of step 620 are assigned to specific Ad Networks provided from the list of Ads Networks 630 extracted from the flowchart 400 of FIG. 4. At step 680, a meme page-level targeting is performed to target Ads to web pages containing the selected meme. The Ads are thus delivered through the Ad Network to an end user viewing the targeted web pages.

Figure 7:
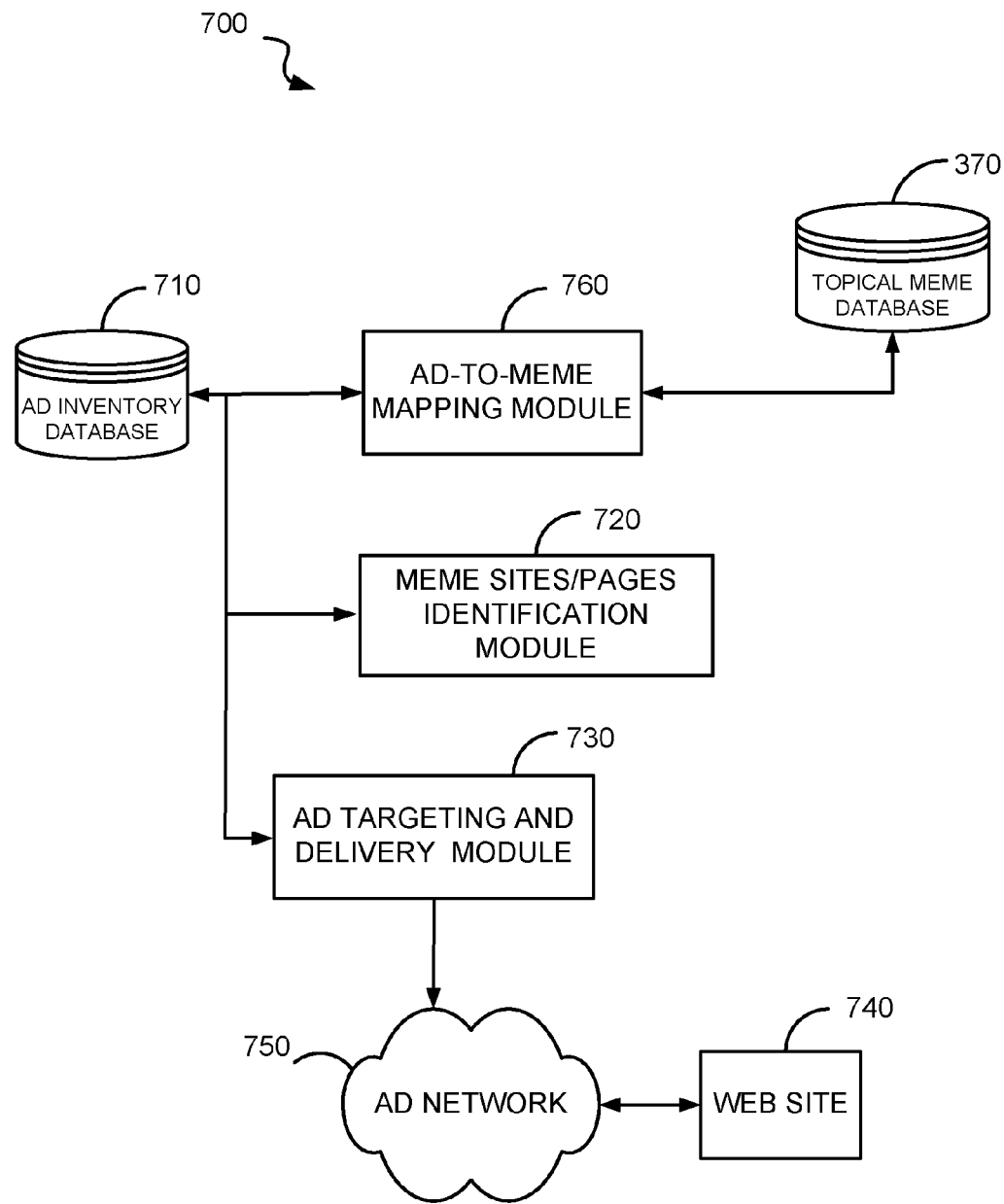
FIG. 7 illustrates a sub-system for Matching and Delivery of advertisements, where the method of FIG. 6 is implemented.

The Ad Matching and Delivery method of FIG. 6 can be implemented using a sub-system 700 of FIG. 7. In the sub-system 700, an Ad-to-Meme Matching module 760 is provided to match Ads stored in the Ads database 710 to the selected meme from the topical meme database 370. As an example, a meme slamming a specific feature of the new Apple iPhone is beneficial to Nokia, and they might want to run an advertisement in the specific content that is part of the meme. In this case, an Ad of Nokia touting the benefits of the Nokia alternative to that specific feature of iPhone would then be mapped to the meme.

The Topical Meme database 370 is connected to a Meme site/page identification module 720, which identifies the page where the meme is present from the content associated with the meme. This identification of the meme page level allows the delivery of Ads at the meme page level using the Ad Targeting and Delivery module 730. The Ad Targeting and Delivery module 730 is provided to interface the Ad Network 750. This module 730 sends the selected Ads through the Ad network 750 to the website 740 hosting content for insertion into the meme page when the content is accessed.

The embodiments of the present invention provides numerous advantages by allowing marketers to target end users according to their interest reflected by the memes buried in the content they access and that can only be unearthed with a fine-tune analysis as set forth in the present invention.

Often these memes can be very beneficial to one or more brands, even if the meme is negative. For instance as stated earlier, a meme slamming the new Apple iPhone is beneficial to Nokia, and Nokia might want to run an advertisement in the specific content that is part of the meme. Nokia's Ad may specifically talk to the problems noted in the iPhone meme, and also talk about the benefits of the alternative provided by Nokia. Such an Ad would be useless shown on another content, which is not related to this meme.

The embodiments of the present invention can keep track of the number of memes launching every day, and millions of sources that they can erupt from. By using the methods of the embodiments of the present invention, someone can research all the sites and content involved in a selected meme, find all the pages containing the meme, and run a dynamic Ad campaign against the pages according to a comparison between the viral dynamics of the content and the deployment threshold of the Ad.

Although the invention has been illustrated with the reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A computer implemented method for targeting advertisement, comprising steps of:

analyzing, by a computer-based system, web content against a defined topic;

obtaining, by the computer-based system and based on the analyzing, topic-matching content related to the defined topic;

processing, by the computer-based system, the topic-matching content;

extracting, by the computer-based system and based on the processing, topical memes associated with the topic-matching content, wherein each of the extracted topical memes is a point of discussion within the defined topic;

measuring, by the computer-based system, an engagement level for each piece of the topic-matching content;

obtaining, by the computer-based system and based on the measuring, a respective viral dynamics metric for each said piece of the topic-matching content, wherein a viral dynamics metric indicates popularity of the piece of the topic-matching content;

accumulating, by the computer-based system and for each of the extracted topical memes, the viral dynamics metrics of the pieces of the topic-matching content;

obtaining, by the computer-based system and based on the accumulating, a respective aggregate viral dynamics value for each of the extracted topical memes;

determining, by the computer-based system, a most active meme from the extracted topical memes, based on the aggregate viral dynamics value for each of the extracted topical memes;

identifying, by the computer-based system, web pages containing the most active meme;

selecting, by the computer-based system, an advertising network servicing a number of content sources hosting the identified web pages;

selecting, by the computer-based system, an advertisement assigned to the most active meme; and delivering, by the computer-based system, said selected advertisement to said number of said content sources through said advertising network.

2. The method of claim 1, further comprising storing the aggregate viral dynamics value for each of the extracted topical memes along with their associated extracted topical meme in a database.

3. The method of claim 1, wherein the step of processing the topic-matching content comprises applying a feature extraction algorithm to said topic-matching content.

4. The method as described in claim 1, wherein the step of selecting the advertising network comprises:
   extracting a list of advertising networks servicing the content sources; and
   selecting from said list the advertising network, having a widest reach.

5. The method of claim 1, wherein the step of selecting the advertisement assigned to the most active meme comprises:
   setting an advertisement deployment threshold for said advertisement;
   comparing the deployment threshold with the aggregate viral dynamics value associated with the most active meme; and
   assigning the advertisement to the most active meme provided the deployment threshold matches the aggregate viral dynamics value associated with the most active meme.

6. The method of claim 5, further comprising:
   maintaining the assigned advertisement on said web pages provided that the aggregate viral dynamics value associated with the most active meme is above the deployment threshold; and
   removing the assigned advertisement from said web pages provided that the aggregate viral dynamics value associated with the most active meme is below the deployment threshold.

7. A system for performing meme-based targeted advertising, comprising:
   a computer, having a processor and a computer readable storage medium storing computer readable instructions for execution by the processor, wherein the instructions, when executed by the processor, cause the computer to perform a method comprising:
   analyzing web content against a defined topic;
   obtaining topic-matching content provided by one or more content sources, the topic-matching content being related to the defined topic;
   processing the topic-matching content;
   extracting topical memes associated with the topic-matching content, wherein each of the extracted topical memes is a point of discussion within the defined topic;
   measuring an engagement level for each piece of the topic-matching content;
   obtaining, based on the measuring, a respective viral dynamics metric for each said piece of the topic-matching content, wherein a viral dynamics metric indicates popularity of the piece of the topic-matching content;
   accumulating, for each of the extracted topical memes, the viral dynamics metrics of the pieces of the topic-matching content;
   obtaining, based on the accumulating, a respective aggregate viral dynamics value for each of the extracted topical memes;
   determining a most active meme from the extracted topical memes, based on the aggregate viral dynamics value for each of the extracted topical memes;
   associating the most active meme to subset content containing the most active meme, wherein the subset content is a subset of said topic-matching content;
   selecting advertising networks servicing said content sources; and
   delivering advertisements through the selected advertising networks to web pages containing the most active meme and included in the subset content.

8. The system as described in claim 7, further comprising a database stored in a computer readable storage medium for storing the aggregate viral dynamics values.

9. The system as described in claim 7, wherein the defined topic is defined by a set of keywords.

10. The system as described in claim 7, wherein the instructions, when executed by the processor, cause the computer to select one or more advertisements matching the most active meme, and cause the computer to compare a deployment threshold associated with said one or more advertisements with the aggregate viral dynamics value associated to said most active meme.

11. A non-transitory computer readable medium, comprising computer code instructions stored thereon, which, when executed by a computer, perform a method comprising:
   analyzing web content against a defined topic;
   obtaining, based on the analyzing, topic-matching content related to the defined topic;
   processing the topic-matching content;
   extracting, based on the processing, topical memes associated with the topic-matching content, wherein each of the extracted topical memes is a point of discussion within the defined topic;
   measuring an engagement level for each piece of the topic-matching content
   obtaining, based on the measuring, a respective viral dynamics metric for each said piece of the topic-matching content, wherein a viral dynamics metric indicates popularity of the piece of the topic-matching content;
   accumulating, for each of the extracted topical memes, the viral dynamics metrics of the pieces of the topic-matching content;
   obtaining, based on the accumulating, a respective aggregate viral dynamics value for each of the extracted topical memes;
   determining a most active meme from the extracted topical memes, based on the aggregate viral dynamics value for each of the extracted topical memes;
   identifying web pages containing the most active meme;
   selecting an advertising network servicing a number of content sources hosting the identified web pages;
   selecting an advertisement assigned to the most active meme; and
   delivering said selected advertisement to said number of said content sources through said advertising network.

* * * * *